United States Patent [19]

Feinbloom

[11] Patent Number: 4,807,985
[45] Date of Patent: Feb. 28, 1989

[54] AUTOMATIC FOCUSING SYSTEM FOR TELESCOPES

[75] Inventor: Richard E. Feinbloom, New York, N.Y.

[73] Assignee: Designs for Vision, Inc., Ronkonkoma, N.Y.

[21] Appl. No.: 156,702

[22] Filed: Feb. 17, 1988

[51] Int. Cl.[4] .................. G02C 1/00; G02C 7/08; G02B 7/02

[52] U.S. Cl. ...................... 351/158; 351/41; 350/548; 350/563; 350/146

[58] Field of Search .............. 351/41, 158; 350/548, 350/563, 145, 146

[56] References Cited

U.S. PATENT DOCUMENTS 4,418,990  12/1983  Gerber.

Primary Examiner—Rodney B. Bovernick
Attorney, Agent, or Firm—Arthur L. Plevy

[57] ABSTRACT

An automatic focusing system for a terrestrial telescope comprises a frame worn on the head of a person, a fixed frame part mounted to the frame in viewing relationship to an eye of the wearer, a movable lens part carrying a telescopic lens which is slidably movable along a telescopic axis relative to the fixed frame part, an engagement member fixed to the movable lens part, a pendulum sensor mounted to the frame for detecting a change in inclination angle of the head of the wearer, and a drive circuit and motor responsive to the sensor for moving the movable lens part to a lens position corresponding to the head inclination angle detected by the pendulum sensor.

7 Claims, 5 Drawing Sheets

AUTOMATIC FOCUSING SYSTEM FOR TELESCOPES

FIELD OF THE INVENTION

This invention relates to an automatic lens focusing system, and particularly to one used for a terrestrial (expanded field) telescope worn by a partially sighted person which automatically focuses from infinity to a near distance depending on the head angle inclination of the wearer.

BACKGROUND OF THE INVENTION

For the visually impaired person, optical aids are available for seeing objects at distances beyond the visual resolution of the unaided eye. A conventional device has a pair of telescopic lenses mounted to the ordinary lenses in a conventional eyeglass frame. The telescopes are designed particularly for distance tasks that are to be performed while the wearer is stationary, such as watching television, theater, sporting events, or spotting distant displays, e.g. a blackboard, stock market quotes, etc., from a seat.

The telescopes typically are constructed of a system of lenses carried in a lightweight plastic housing, and are mounted to or through the ordinary lenses. For increased versatility, the telescopes can be mounted higher on the ordinary lenses, so that they are out of the way for seeing near distances through the ordinary lenses. These are called bioptic telescopes. Alternatively, reading lens caps can be removably attached to the front of the telescopes to allow the wearer to switch to working at near distances. To provide assisted vision at variable distances, the telescopes can be of the spiral expanded field (terrestrial) type which are manually adjustable for viewing from infinity to intermediate and near distances. In any event, one can also employ Galilean telescopes which are designed for distance tasks that are to be performed by a handicapped user.

The conventional telescopes have the problem that they are designed for a particular magnification power and are in focus only for a specified far distance the wearer wants to see. For nearer distances, the wearer must affix the reading caps on the telescopes, switch or remove the glasses, or manually adjust the spiral expanded field telescopes for changing distances. These devices have the common problem that they are cumbersome and disorienting for the wearer. With conventional terrestrial telescopes, the experience is analogous to the difficulty of using a pair of binoculars while switching between focusing on far and near objects.

Some optical devices, such as cameras, have automatic focusing systems for focusing an objective lens over a range of distances. However, such systems generally employ complex and costly distance measuring sensors, which are dependent on precisely locating an object to be focused on and most of these devices need to accurately locate the exact distance of the object from the camera.

SUMMARY OF THE INVENTION

Accordingly, it is a principal object of the invention to provide an automatic focusing system for a terrestrial telescope worn by a person which is simple and inexpensive in construction and is convenient for the wearer to use. It is a particular object of the invention to provide a system which is not dependent on measuring the distances to objects to be focused on, and which can provide a satisfactory degree of focusing resolution using a relatively simple mechanism.

In accordance with the invention, an automatic focusing system for a terrestrial telescope comprises a frame worn on the head of a wearer, a fixed frame part mounted to the frame in viewing relationship to an eye of the wearer, a movable lens part carrying a telescopic lens which is slidably movable along a telescopic axis relative to the fixed frame part, an engagement member fixed to the movable lens part, a sensor mounted to the frame for detecting an inclination angle of the head of the wearer, and moving means including a motor responsive to the sensor for moving the movable lens part to a lens position corresponding to the inclination angle detected by the sensor.

In the preferred embodiment, the sensor is a pendulum sensor provided with a photodetector for detecting a change in position of the pendulum corresponding to a change in inclination angle of the wearer's head. A drive circuit responsive to the photodetector drives the motor to move the lens to a new position corresponding to the change in inclination angle. When the wearer's head is in a straight ahead position, the telescopic lens is focused for infinity, and as the wearer's head is inclined downward, the lens is focused for shorter distances down to a minimum reading distance.

BRIEF DESCRIPTION OF FIGURES

The above objects and advantages and further features of the invention are described in detail below in conjunction with the drawings, of which.

DETAILED DESCRIPTION OF THE INVENTION

Figure 1:
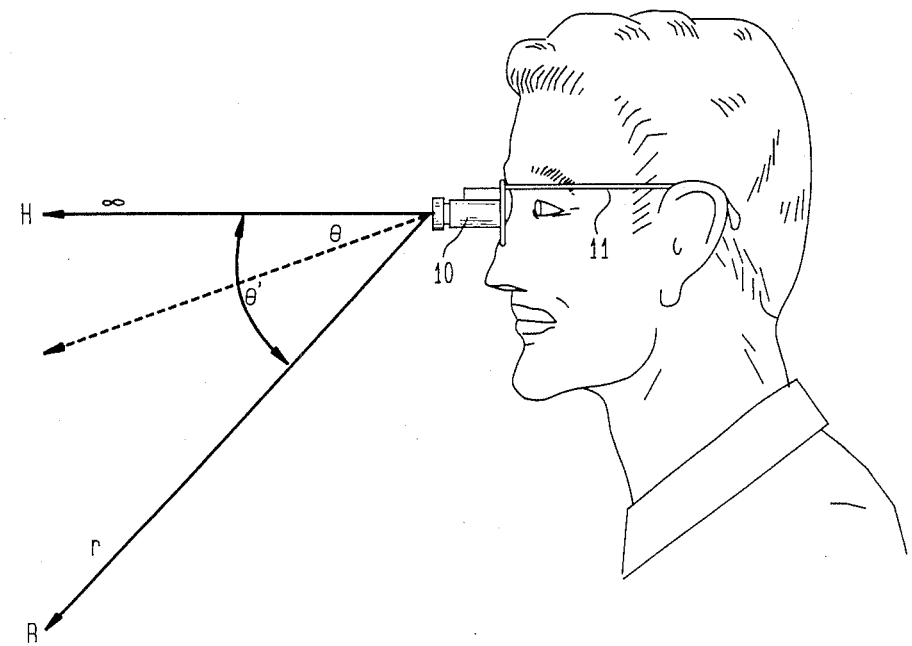
FIG. 1 is a perspective view of a terrestrial telescope device worn on the head of a visually impaired person.

Referring to FIG. 1, a person with a visual impairment is shown wearing ordinary eyeglass frames 11 having an expanded field, terrestrial telescope system 10 mounted thereon. The telescope system 10 is capable of focusing between infinity, shown in the drawing in the straight ahead direction of the wearer's head toward a horizon H, and closer distances when the wearer's head is inclined downward through an angle $\theta$, such as when viewing work on a desk. The minimum focusing distance r is set for a comfortable reading distance, which is typically about 10 inches, which occurs when the wearer's head is inclined at a maximum downward angle $\theta'$.

Figure 2:
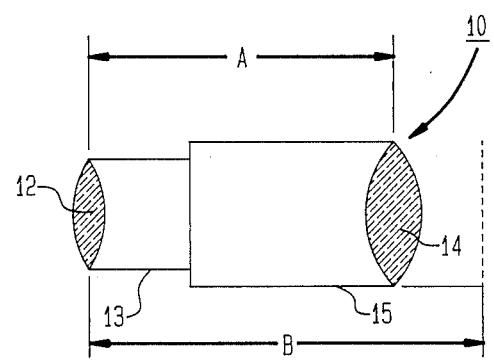
FIG. 2 is a cross-sectional view of a terrestrial telescope having an expanded field between infinity and a close viewing distance.

As shown in FIG. 2, the telescope system 10 has a proximate lens component or ocular lens assembly 12 which is supported in a fixed frame part 13 that is attached to the eyeglass frame 11, and a distal lens component or objective lens 14 which is carried at the end of a movable lens carrier or cylindrical assembly 15. The lens carrier 15 is movable between a close (reading) range lens position B and a far (infinity) range lens position A.

Figure 3:
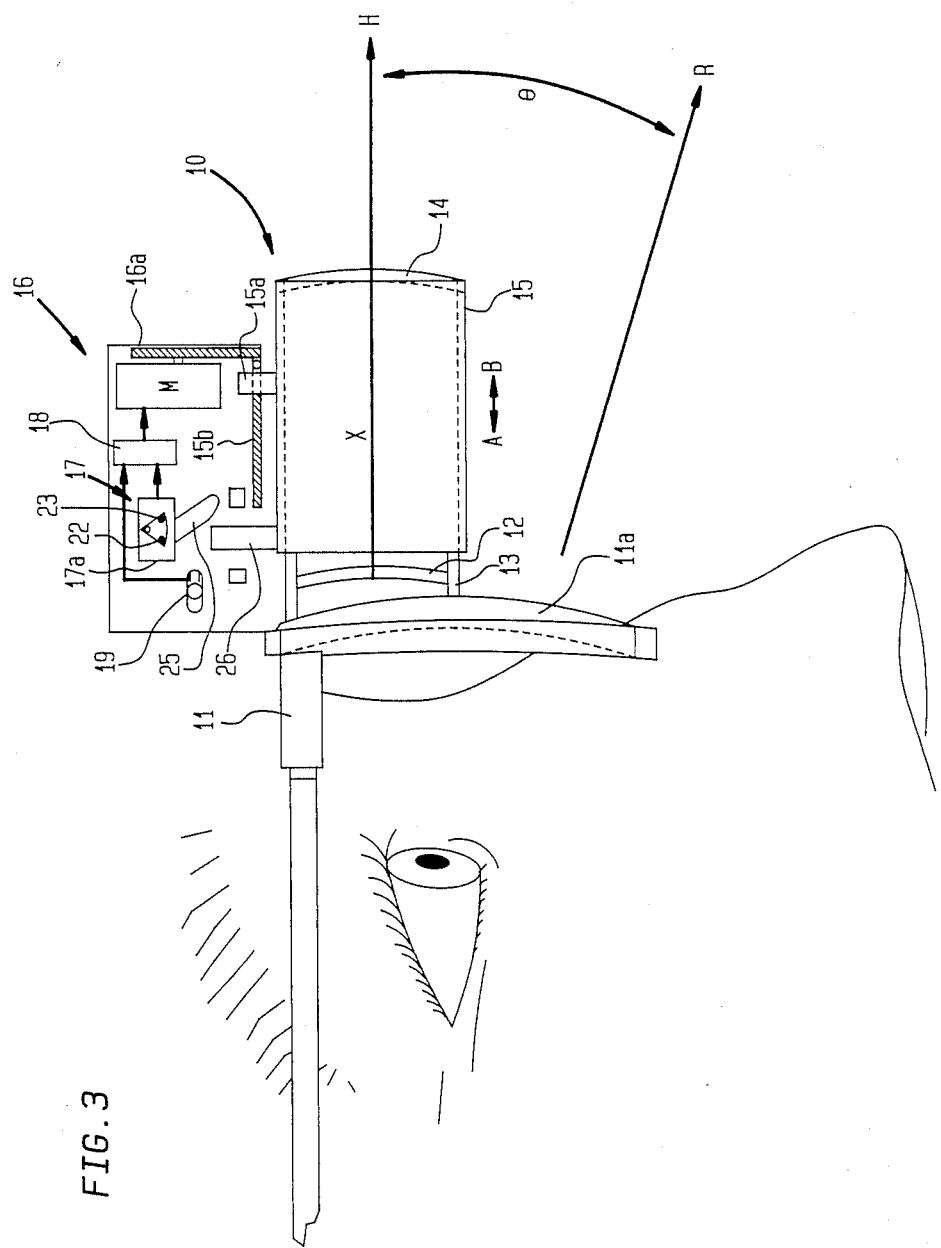
FIG. 3 is a cross-sectional view of an automatic focusing system for the terrestrial telescope in accordance with the invention.

In accordance with the invention, an automatic focusing system is provided for automatically moving the movable lens carrier 15 relative to the fixed frame part 13 in correspondence with the inclination angle $\theta$ of the wearer's head. As shown in FIG. 3, the fixed frame part 13 of the telescope system 10 is mounted to the wearer's eyeglass frame 11. It is understood that the fixed frame part 13 can be the non-movable ocular assembly which may be secured in an aperture in the lens 11a and held in place by means of a threaded nut. It is understood that proximate lens component or ocular assembly is non-movable with respect to the movable lens carrier 15. For a full field telescope, the telescope system 10 would be mounted so that the telescope lens components have their optical axis X aligned in the center with the optical axis of the ordinary lenses 11a. The lens 11a serves as a carrier lens for accommodating the telescopic assembly. For a bioptic telescope, as shown in FIG. 2, the telescope system 10 is mounted higher up from the center axis of the ordinary lenses 11a, so that the wearer can use the familiar prescription of the ordinary lenses 11a for unmagnified viewing distances.

The movable lens carrier 15 is moved by an automatic focusing system 16 between the reading lens position B and the infinity lens position A according to inclination of the wearer's head. The system is incorporated in a casing 16a which is fixedly mounted to the telescope assembly 10, the portion of which does not move. The lens carrier 15 has a threaded follower member 15a attached thereto, which is threadably engaged with a screw shaft 15b journaled in the casing 16a so that the lens carrier is slidably moved along the optical axis X between focus positions A and B.

A pendulum sensor 17 detects inclination of the wearer's head by the relative movement of a pendulum 20 to its walls 17a, 17b. Photodetectors 22, 23 mounted in the walls provide a detection signal to a drive circuit 18, which provides a driving output to a motor M. The output of the motor is geared to rotate the screw shaft 15b to move the lens carrier 15. When the carrier is moved, an engagement member 26, fixed to the carrier and abutting a cam 25 fixed to the sensor 17, restores the sensor to its neutral position relative to the pendulum, thereby cutting off the photodetectors and stopping the driving of the motor.

For terrestrial telescopes that are normally used in viewing situations range from straight ahead distance viewing to close up reading or working at a desk, the range of inclination of the wearer's head only varies from the straight ahead position toward the horizon H to the downward maximum angle $\theta$ ', for the reading position R. Therefore, the drive circuit 18 is only actuated to drive the motor M when the wearer's head moves from a substantially level position to a downward angle $\theta$, and vice versa. A level switch 19, such as a mercury switch, is provided to close the contacts of the drive circuit when a downward inclination causes the movable (mercury) contact to close the switch. At the level position, the telescope lenses 12, 14 are focused on infinity. When the wearer's head is inclined upward, the switch 19 is kept open, the motor M is not driven, and the telescope remains focused for infinity.

Figure 4:
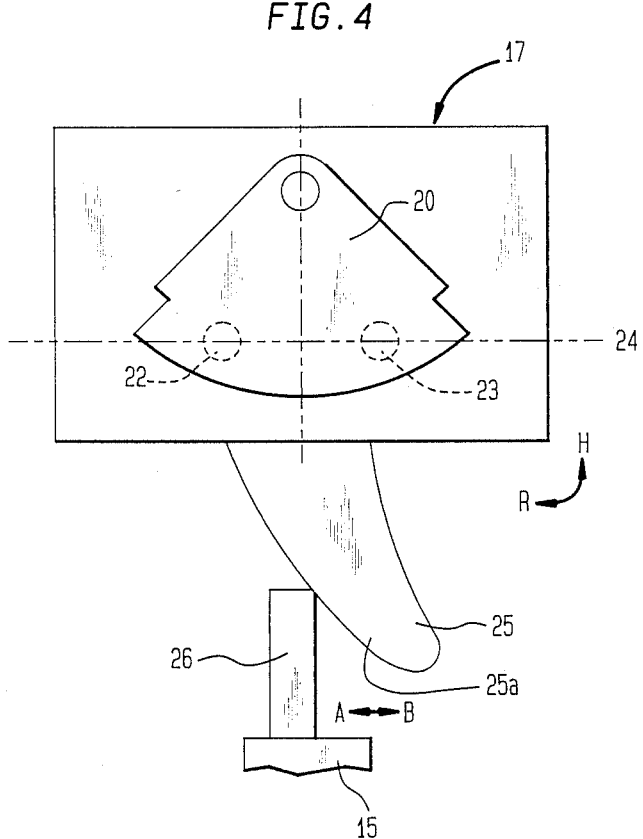
FIG. 4 is a schematic view showing a pendulum sensor for the automatic focusing system.
Figure 5:
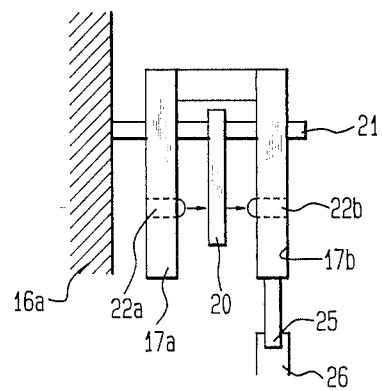
FIG. 5 is a side view of the pendulum sensor of FIG. 4.

As shown in FIGS. 4 and 5, the pendulum sensor 17 is formed by a double-walled housing which is pivotable on a pin 21 fixed in the casing 16a. The housing has two spaced apart walls 17a, 17b in parallel, and a pendulum 20 is provided in between the walls swingable under gravity on the axis of the pin 21. A pair of photodetectors 22, 23 are provided spaced apart along a longitudinal axis 24 of the housing 17, each photodetector being formed by a light emitting element 22a, 23a provided in one wall 17a, and a light detecting element 22b, 23b provided oppositely in the other wall 17b. In FIG. 5, 23a and 23b are not shown due to the nature of the view. The cam 25 is fixed to the lower part of one of the walls. The cam has a cam surface 25a which is abutted by the engagement member 26 fixed to the lens carrier 15. The curvature of the cam surface 25a is shaped to provide the desired correspondence between lens positions A and B of the telescope lens 14 contained in housing section 15 and the angle of head inclination between angular positions H and R.

Figure 6A:
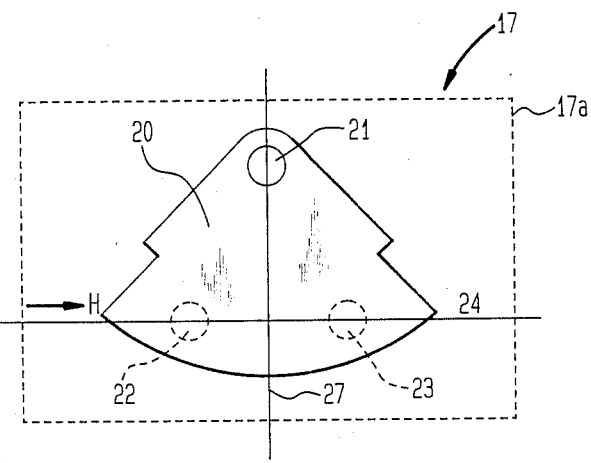
FIGS. 6A–6C show schematically the operation of the pendulum sensor.
Figure 6B:
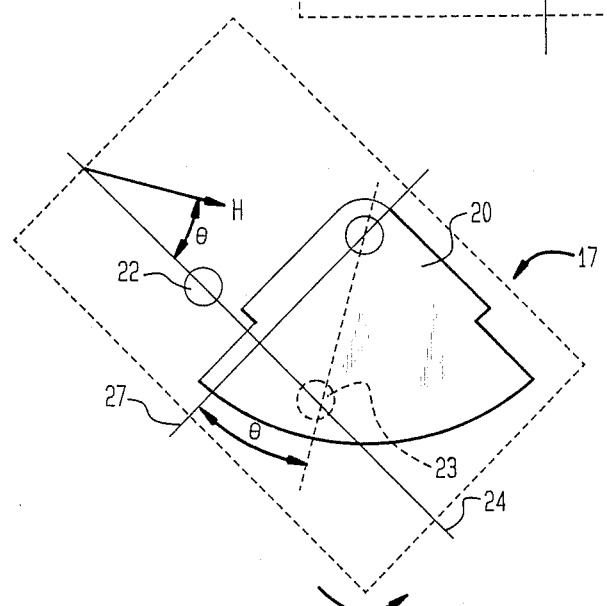
Figure 6C:
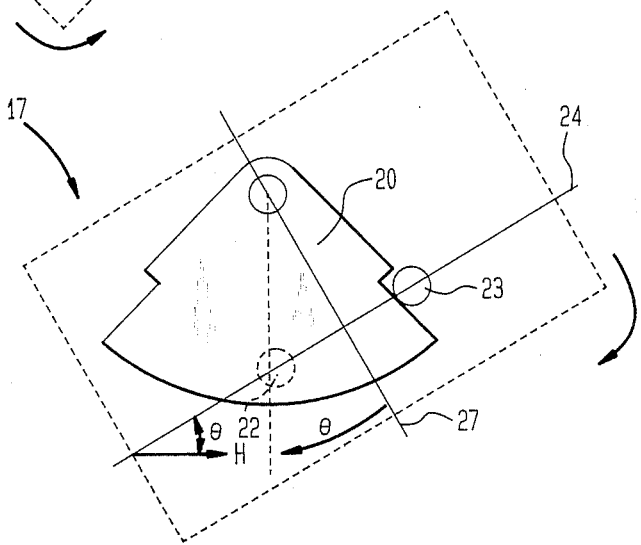

The operation of the pendulum sensor 17 is illustrated in FIGS. 6A–6C. When the wearer's head is in the level position for distant viewing toward horizon H, indicated by the arrow in FIG. 6A, the pendulum 20 is centered on the neutral axis 27, centered relative to the axis of pin 21, and blocks both photodetectors 22, 23. The drive circuit remains unactivated, and the lens carrier is in the position focused on infinity.

When the wearer head is inclined at an downward angle 0 from the level position H, as shown in FIG. 6B, the pendulum is swung relatively by the angle 0 rightward from the neutral axis 27 and exposes the photodetector 22. The photodetector 22 provides a detection output which activates the drive circuit 18 to drive the lens carrier 15 (rightward in FIG. 3 for close-up focusing). As the carrier 15 is moved, the engagement member 26 engages the cam 25 to pivot the sensor housing 17 until the pendulum is restored to the neutral axis 27.

In FIG. 6C, if the wearer's head is initially inclined downward and is now raised upward to the level position by the angle $\theta$, the pendulum is swung relatively by the angle $\theta$ leftward from the neutral axis 27 of the sensor housing 17 and exposes the right photodetector 23. Accordingly, the drive circuit 18 is activated to drive the lens carrier leftward to the far viewing position H, until the pendulum is again restored to the neutral axis 27.

Figure 7:
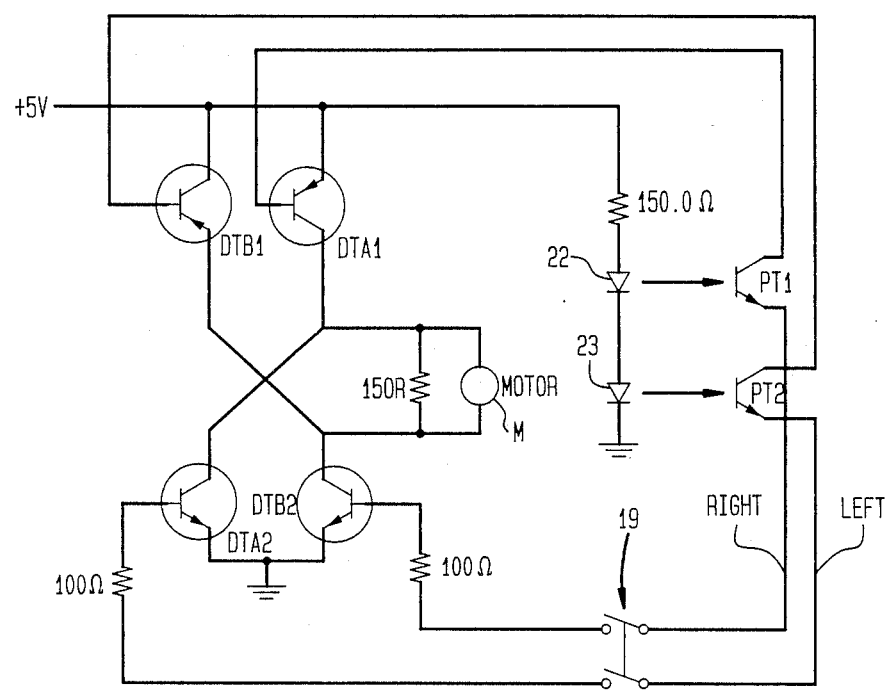
FIG. 7 is a circuit diagram of a drive circuit for the automatic focusing system.

An example of a drive circuit for the motor is shown in FIG. 7. A pair of photodiodes, indicated at 22, 23, provides a light output which is detected by one of the phototransistors PT1 and PT2, respectively, depending on whether the pendulum is swung rightward or leftward relative to the neutral axis of the sensor housing. The output of the phototransistors provides an output signal to the drive transistors DTB1 and DTB2, or DTA1 and DTA2, so as to drive the motor in the corresponding direction to move the lens carrier either rightward or leftward, respectively. The level switch 19 closes the drive circuit for automatically focusing the telescope lenses only for head inclinations between the level position and a downward angle.

The specific embodiments of the invention described above are intended to be illustrative only, and variations and modifications can be made thereto in accordance with the principles of the invention. For example, the telescope system can be configured so that the level position of the head corresponds to an intermediate viewing distance, such as across a normal sized room, and the level switch can be a two-pole switch which activates the drive circuit to move the telescope lenses to focus on infinity when the head is inclined upward. The photodetectors can be replaced by a magnetic sensor which provides a signal to the drive circuit directly corresponding to the angle of inclination of the head relative to an axis toward the earth, so that the drive circuit can drive the lens carrier to the proper focusing position. Similarly, the cam and engagement member can be replaced by a memory which stores the lens positions corresponding to the detected inclination angles. All such embodiments and obvious variations and modifications thereof are considered to be within the scope of the invention, as defined in the following claims.

I claim:

1. An automatic focusing system for a terrestrial telescope for aiding an eye of a wearer, comprising:
   a frame worn on the head of the wearer;
   a fixed frame part mounted to the frame in viewing relationship to the wearer's eye;
   a movable lens part carrying the telescopic lens which is slidably movable along a telescope axis relative to the fixed frame part;
   a member on the movable lens part which moves together therewith so as to define a lens position of the movable lens part along the telescope axis;
   a sensor mounted to the frame for detecting an inclination angle of the head of the wearer; and
   moving means including a motor responsive to the sensor for moving the movable lens part to a lens position relative to the fixed frame part corresponding to the inclination angle detected by the sensor.

2. An automatic focusing system according to claim 1, wherein the sensor is a pendulum sensor comprising:
   a sensor housing pivotable on a pin fixed to the frame, and having a pivot axis in parallel with an axis of inclination of the head of the wearer;
   a cam fixed to the sensor housing which is engaged with the member on the movable lens par such that the sensor housing is angularly pivoted along with the sliding movement of the movable lens part;
   a pendulum freely swingable under gravity on the pin relative to a neutral axis of the sensor housing; and
   a photodetector mounted to the sensor housing for detecting angular movement of the pendulum from the neutral axis relative to the sensor housing and providing a detection signal to the moving means indicative thereof,
   wherein said moving means moves the movable lens part and pivots the sensor housing engaged therewith until the pendulum is restored to the neutral axis position relative to the sensor housing.

3. An automatic focusing system according to claim 1, wherein said sensor detects inclination of the wearer's head between a level position for viewing far distances and a downward position for reading, and said moving means correspondingly moves the movable lens part between lens positions for focusing on infinity and on a reading distance, respectively.

4. An automatic focusing system for a telescope of the type worn by a handicapped person, with said telescope assembly supported by an eyeglass frame worn by said person which frame has a carrier lens for supporting said telescope, said telescope having a movable objective lens assembly which move along a given axis with respect to a stationary ocular lens assembly supported by said carrier lens, in combination therewith;
   a sensor means mounted to said stationary ocular lens assembly for detecting an inclination angle of the head of said person; and
   moving means coupled to said movable objective lens assembly for moving said objective lens assembly to an objective lens position relative to said ocular lens assembly corresponding to the inclination angle detected by said sensor means.

5. The automatic focusing system according to claim 4 wherein said sensor means includes a pendulum sensor.

6. The automatic focusing system according to claim 5 further including a sensor housing pivotable on a pin fixed with respect to said frame and having a pivot axis in parallel with the axis of inclination of the head of said person;
   a cam fixed to said sensor housing;
   a member positioned on said movable assembly such that said sensor housing is angularly pivoted along with the movement of said movable assembly to place said sensor in a non-inclination mode responsive to detecting means when said movable assembly is moved a given distance indicative of said inclination.

7. The apparatus according to claim 6 wherein said detecting means includes a photodetector mounted to said sensor housing for detecting angular movement of said pendulum sensor from a non-inclination mode and providing a detecting signal to said moving means indicative of said sensor housing moved said given distance.

* * * * *